US010641655B2

(12) United States Patent
Ma et al.

(10) Patent No.: US 10,641,655 B2
(45) Date of Patent: May 5, 2020

(54) DIRECT ABSOLUTE SPECTROMETER FOR DIRECT ABSOLUTE SPECTROMETRY

(71) Applicant: Government of the United States of America, as Represented by the Secretary of Commerce, Gaithersburg, MD (US)

(72) Inventors: Lijun Ma, Rockville, MD (US); Xiao Tang, Gaithersburg, MD (US); Oliver Slattery, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/039,391

(22) Filed: Jul. 19, 2018

(65) Prior Publication Data
US 2019/0376846 A1  Dec. 12, 2019

Related U.S. Application Data

(60) Provisional application No. 62/683,291, filed on Jun. 11, 2018.

(51) Int. Cl.
  *G01J 3/02* (2006.01)
  *G01J 3/42* (2006.01)
  *G01J 3/10* (2006.01)

(52) U.S. Cl.
  CPC .......... *G01J 3/0213* (2013.01); *G01J 3/0237* (2013.01); *G01J 3/10* (2013.01); *G01J 3/42* (2013.01)

(58) Field of Classification Search
  CPC .... G01J 3/0213; G01J 3/10; G01J 3/42; G01J 3/0237
  See application file for complete search history.

(56) References Cited

U.S. PATENT DOCUMENTS

| 6,028,873 A * | 2/2000 | Yamamoto | G02F 1/3515 372/39 |
| 2005/0175358 A1* | 8/2005 | Ilchenko | G02F 1/011 398/198 |

(Continued)

OTHER PUBLICATIONS

Whiteneck, B., et al., "Electromagnetically Induced Transparency (EIT) Amplitude Noise Spectroscopy", 2018.

(Continued)

*Primary Examiner* — Hina F Ayub
(74) *Attorney, Agent, or Firm* — Office of Chief Counsel for National Institute of Standards and Technology

(57) ABSTRACT

A direct absolute spectrometer includes: a first light source; a second light source; an optical combiner that produces dual light; an optical cell that receives the dual light; an electromagnetically induced transparent medium that is optically transparent to single photon light in a presence of pump light, such that output light is produced; and a filter that filters output light and provides EIT light free from, wherein electromagnetically induced transparent EIT light is a direct and absolute metric of a linewidth and a wavelength of single photon light such that the direct absolute spectrometer provides direct and absolute determination of the linewidth of the single photon light and direct and absolute determination of wavelength at a maximum of intensity of the single photon light.

18 Claims, 11 Drawing Sheets

(56) References Cited

U.S. PATENT DOCUMENTS

| | | | | |
|---|---|---|---|---|
| 2006/0256427 A1* | 11/2006 | Kuekes | .................... | G02F 1/03 |
| | | | | 359/321 |
| 2008/0089696 A1* | 4/2008 | Furuta | ................... | H04L 9/0855 |
| | | | | 398/175 |
| 2011/0075239 A1* | 3/2011 | Moiseev | ............... | G02F 1/3515 |
| | | | | 359/241 |

OTHER PUBLICATIONS

Zhao, J., et al., "High sensitivity spectroscopy of cesium Rydberg atoms using electromagnetically induced transparency", Optics Express, 2009, p. 15821, vol. 17 No. 18.

\* cited by examiner

Δ: frequency detuning from atomic transition
ω: frequency detuning of the resonance of two optical fields

DIRECT ABSOLUTE SPECTROMETER FOR DIRECT ABSOLUTE SPECTROMETRY

CROSS REFERENCE TO RELATED APPLICATIONS

The application claims priority to U.S. Provisional Patent Application Ser. No. 62/683,291 filed Jun. 11, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference NIST Docket Number 18-018US1.

BRIEF DESCRIPTION

Disclosed is a direct absolute spectrometer to perform direct absolute spectrometry, the direct absolute spectrometer comprising: a first light source that provides single photon light; a second light source that provides pump light; an optical combiner in optical communication with the first light source and in optical communication with the second light source and that: receives the single photon light from the first light source; receives the pump light from the second light source; combines the single photon light and the pump light; and produces dual light that comprises the single photon light and the pump light; an optical cell that receives the dual light from the optical combiner; an electromagnetically induced transparent (EIT) medium disposed in the optical cell, the EIT medium being: optically transparent to the single photon light in a presence of the pump light, such that the EIT medium produces output light comprising: the pump light; and an EIT light; and optically opaque to the single photon light in an absence of the pump light, such that the EIT medium does not produce the output light; and a filter in optical communication with the EIT medium and that: receives the output light from the optical cell when output light is produced by EIT medium; and filters the pump light from the output light; and provides EIT light free from pump light, wherein EIT light is a direct and absolute metric of a linewidth and a wavelength of the single photon light such that direct absolute spectrometer provides direct and absolute determination of the linewidth of the single photon light and direct and absolute determination of wavelength at a maximum of intensity of the single photon light.

Also disclosed is a process for performing direct absolute spectrometry, the process comprising: combining a single photon light with a pump light; producing a dual light in response to combining the single photon light and the pump light; subjecting an EIT medium to the dual light; producing, in the EIT medium, interacting light as the dual light propagates through the EIT medium; producing, from the EIT medium, output light from the interacting light when the EIT medium is optically transparent to the single photon light in a presence of the pump light, the output light comprising: the pump light; and an EIT light; and absorbing the single photon light when the single photon light propagates in the EIT medium in an absence of the pump light, such that the EIT medium does not produce the output light; filtering the output light to remove the pump light; and producing, from filtering the output light, EIT light in an absence of the pump light to perform direct absolute spectrometry.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a direct absolute spectrometer has ultra-high resolution, is accurate and sensitive and provides a determination of a narrow-linewidth single photon source. Electromagnetically-induced transparency (EIT) is an optical phenomenon around atomic transition absorption that provides a very narrow transparent window. The direct absolute spectrometer includes an EIT medium. Beneficially and unexpectedly, the direct absolute spectrometer provides a spectral resolution of better than 150 kHz, a wavelength determination that is accurate to within 50 kHz, and is sensitive to an optical signal that is as weak as −117 dBm. Advantageously, the direct absolute spectrometer overcomes problems with convention technologies that are based on dispersive optical elements, which limits their resolution to GHz and which involve calibration by an atomic cell to provide a wavelength reading. Instead, the direct absolute spectrometer involves EIT and provides sub-MHz resolution and direct and absolute wavelength determination.

Figure 1:
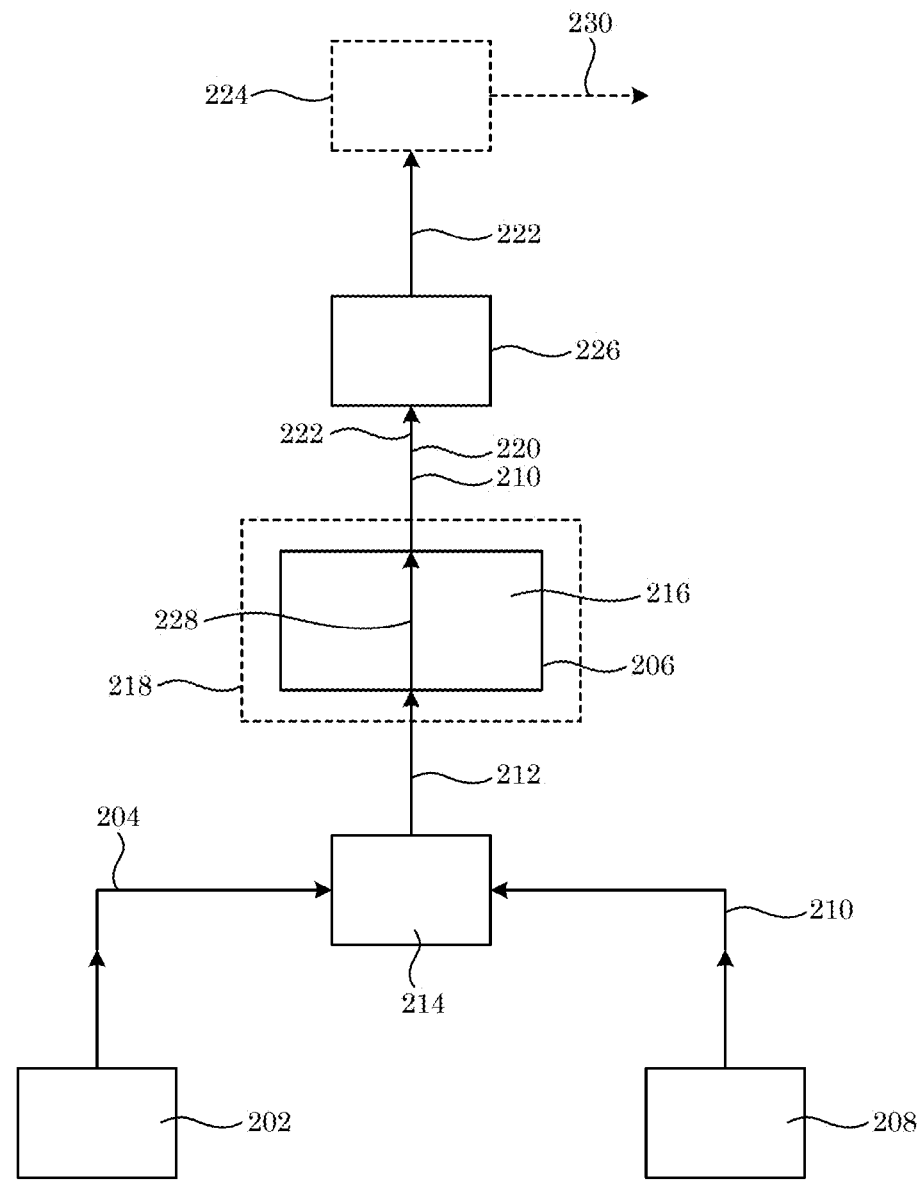
FIG. 1 shows a direct absolute spectrometer.

Direct absolute spectrometer performs direct absolute spectrometry. In an embodiment, with reference to FIG. 1, direct absolute spectrometer 200 includes first light source 202 that provides single photon light 204; second light source 208 that provides pump light 210; optical combiner 214 in optical communication with first light source 202 and in optical communication with second light source 208. Second light source 208 receives single photon light 204 from first light source 202; receives pump light 210 from second light source 208; combines single photon light 204 and pump light 210; and produces dual light 212 that comprises single photon light 204 and pump light 210. Direct absolute spectrometer 200 also includes optical cell 206 that receives dual light 212 from optical combiner 214; and electromagnetically induced transparent (EIT) medium 216 disposed in optical cell 206. EIT medium 216 is optically transparent to single photon light 204 in a presence of pump light 210 such that EIT medium 216 produces output light 220 that includes pump light 210 and EIT light 222. Further, EIT medium 216 is optically opaque to single photon light 204 in an absence of pump light 210 such that EIT medium 216 does not produce output light 220 when single photon light 204 is in an absence of pump light 210. Direct absolute spectrometer 200 also includes filter 226 in optical communication with EIT medium 216. Filter 226 receives output light 220 from optical cell 206 when output light 220 is produced by EIT medium 216; and filters pump light 210 from output light 220; and provides EIT light 222 free from pump light 210. EIT light 222 is a direct and absolute metric of a linewidth and a wavelength of the single photon light 204 such that direct absolute spectrometer 200 provides direct and absolute determination of the linewidth of the single photon light 204 and direct and absolute determination of wavelength at a maximum of intensity of the single photon light 204.

Direct absolute spectrometer 200 can include magnetic shield 218 disposed on optical cell 206 to shield EIT medium 216 from a magnetic field external to optical cell 206. Moreover, detector 224 can be disposed in optical communication with filter 226, wherein detector 224 receives EIT light 222 from filter 226 and produces EIT signal 230, based on EIT light 222.

Figure 2:
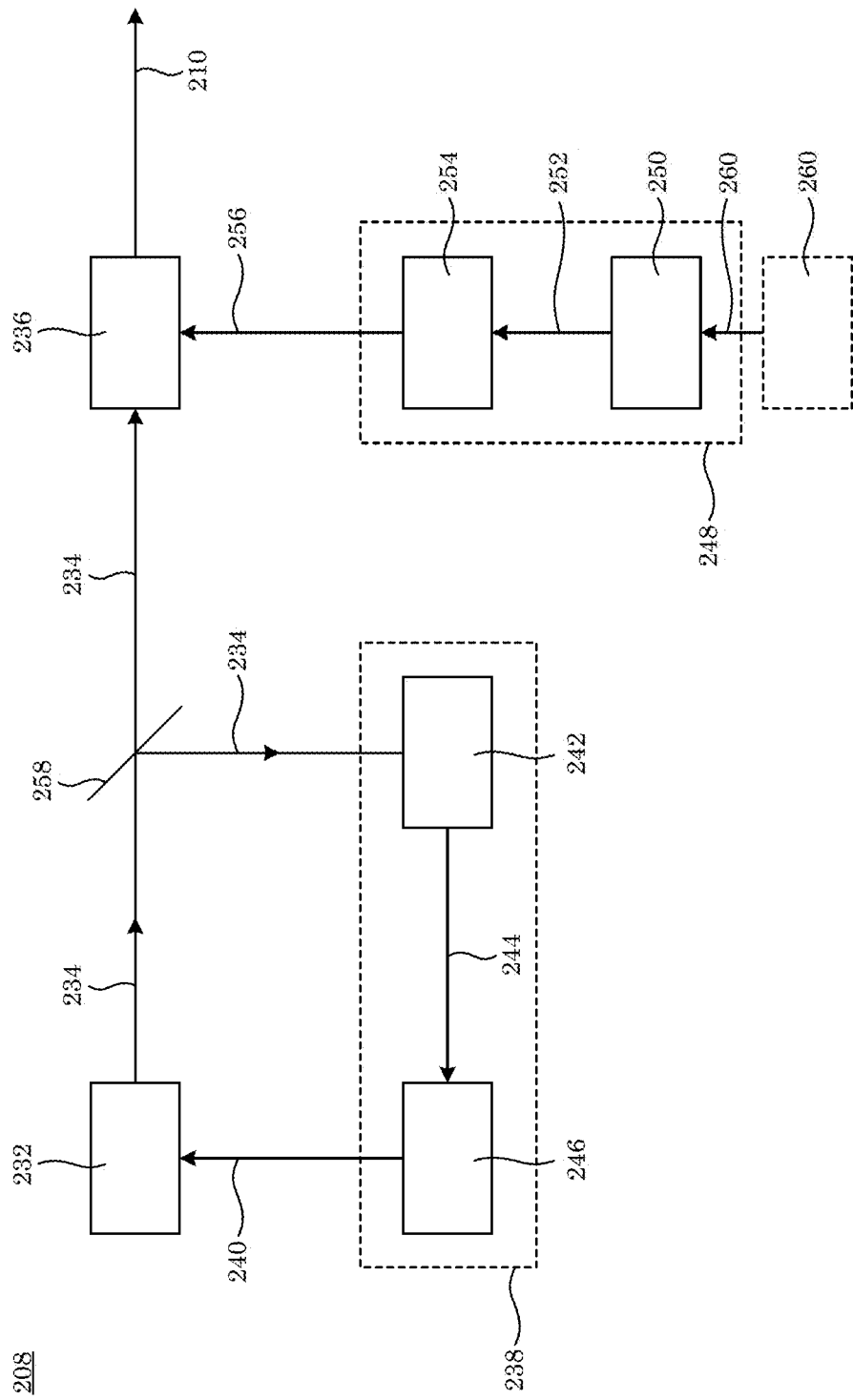
FIG. 2 shows a second light source.

According to an embodiment, with reference to FIG. 2, second light source 208 includes laser 232 that produces laser light 234; wavelength tuner 236 in optical communication with laser 232 and that receives laser light 234 from laser 232 and produces pump light 210. Wavelength locker 238 can be disposed in optical communication with laser 232, wherein wavelength locker 238 receives laser light 234 from laser 232; and produces laser lock 240 that is communicated to laser 232 to lock a wavelength of laser light 234. Wavelength locker 238 can include reference cell 242 in optical communication with laser 232, wherein wavelength locker 238 receives laser light 234 from laser 232 and produces reference signal 244, based on laser light 234. Feedback unit 246 is in communication with reference cell 242, receives reference signal 244 from reference cell 242, and produces laser lock 240, based on reference signal 244. Second light source 208 further can include tuner controller 248 in electrical communication with wavelength tuner 236. Tuner controller 248 produces control signal 256 that is communicated to wavelength tuner 236 to control production of pump light 210 by wavelength tuner 236.

First light source 202 produces single photon light 204. It is contemplated that first light source 202 can include single photon sources that can be used for quantum information systems. Single photon light 204 can have a wavelength from ultra-violet (UV) to infrared, and more specifically for the wavelength of atomic transitions. A linewidth of single photon light 204 can be from 100 kHz to 100 MHz, specifically in a few or tens of MHz. Moreover, the intensity of the light can be as weak as a single photon level.

In direct absolute spectrometer 200, second light source 208 can include laser 232, beam splitter 258, and a wavelength locking system 238, and can generate a stable pump light whose wavelength is locked to a certain atomic transition wavelength. Pump light 210 can have a wavelength from ultra-violet (UV) to infrared, and more specifically for the wavelength of atomic transitions. The linewidth of pump light 210 can be narrow and within tens of kHz. Moreover, the locking accuracy of the laser can be within tens of kHz. It is contemplated that single photon light 204 and pump light 210 have a wavelength difference, which is usually an amount of difference in the ground energy levels of the EIT media 216. In an embodiment, when the EIT media is Cesium atom, the wavelength difference is 9.2 GHz.

Optical combiner 214 combines single photon light 204 and pump light 210 to produce dual light 212. Optical combiner 214 can be a polarizing beam splitter or an optical polarizing combiner that combines single photon light 204 and pump light 210 in perpendicular polarization states. Optical combiner 214 can have anti-reflection (AR) coating on surfaces to reduce the loss of single photon light 201 and pump light 212. Dual light 212 can have both wavelengths of single photon light 201 and pump light 212, and which co-propagate in the same direction.

In direct absolute spectrometer 200, optical cell 206 can be a container with EIT materials. The cell can be made from quartz or glasses. The shape of the cell can be a cylinder. The input and output surfaces can have AR coating to reduce the loss EIT medium 216 is disposed in optical cell 206. EIT medium 216 can be any elements with EIT phenomena. Exemplary EIT media include alkali elements. In an embodiment, EIT medium 216 is an atomic vapor. According to an embodiment, EIT medium 216 is a vapor of cesium atoms, and its working wavelengths are around 852 nm and 895 nm. It is contemplated that there is a difference between a wavelength of EIT light 222 and pump light 210. In an embodiment, the difference is 9.2 GHz, which corresponds to an energy difference between two energy levels of a ground state of cesium atom.

Magnetic shield 218 is disposed on optical cell 206 to shield the external magnetic field and can include a plurality of layers. Exemplary materials for magnetic shield 218 include µ-metal. A structure of optical cell 206 can include three layers of cylindrical tubes.

In EIT medium 216, dual light 212 interacts with EIT medium 216. Here, because of the EIT phenomena, the dual light 212 interacts with EIT medium 216 and can have an interference resulting in a narrow transparent window around the wavelength range of single photon light 204. Dual light 212 becomes interacting light 228, which includes pump light 210 and partial narrow selection of single photon light 204 that is transmitted through the transparent window (becoming EIT light 222). Interacting light 228 exits EIT medium 216 of optical cell 206 as output light 220 that includes pump light 210 and EIT light 222 if single photon light 204 is in a presence of pump light 210 in EIT medium 216. As used herein, single photon light 204 is in a presence of pump light 210 when single photon light 204 spatially and temporally overlaps with pump light 210. Otherwise, single photon light 204 is in an absence of pump light 210. Accordingly, it should be understood that output light 220 includes EIT light 222 and pump light 210 when single photon light 204 is in a presence of pump light 210 in EIT medium 216. Otherwise, single photon light 204 is in an absence of pump light 210 in EIT medium 216, wherein single photon light 204 is absorbed by EIT medium 216, and EIT medium 216 only transmits pump light 210 instead of output light 220.

Filter 226 receives output light 220 from optical cell 206 and filters output light 220 by removing pump light 210 and leaving EIT light 222. Filter 226 can include a polarizer, etalon, atomic filters, or a combination thereof, and the like. In an embodiment, filter 226 includes a high extinction ratio Glen polarizer and two etalons. Moreover, the spectrum of residual light of 210 passed the filter 226 is independent to single photon signal 204 and can be partially removed by post-processing.

Filter 226 transmits EIT light 222 to detector 224. Detector 224 can be any optical detector that can detect a single photon level signal. Exemplary detectors 224 include an avalanche photodiode (APD), photomultiplier (PMT), superconducting single photon detector, and the like. A wavelength range that detector 224 detects can cover the wavelength of single photon signal 204.

With regard to second light source 208, laser 232 can be a laser diode, whose wavelength can be tuned by adjusting driving current and temperature. In direct absolute spectrometer 200, laser light 234 is used as pump light, wherein a wavelength of laser light 234 is locked to a certain transition wavelength of EIT medium 216. Beam splitter 258 samples laser light 234, typically 1-5% thereof, and sends this portion to wavelength locking system 238. Wavelength locking system 238 has a reference cell 242 and feedback unit 246 for the wavelength locking of the laser 232. Reference cell 242 can be a cell containing reference gas for the laser wavelength locking. Reference signal 244 can be a signal that indicates the wavelength difference between the light 234 and the absorption wavelength of reference cell 242. Feedback unit 246 can be a closed-loop system including circuit to lock the laser wavelength. Laser lock signal 240 can be generated form feedback unit 246 to control laser 232. Tuner controller 248 can provide wavelength tuning to the laser light 234. Program unit 260 can be a program to tune the wavelength of pump light 210 and collect data from EIT signal 230 to generate the spectrum of single photon light 204. Program signal 258 can be a signal from program unit 260 to control generator. Control generator 250 generates control signal 252 according to program signal 258. Control signal 252 is a radio frequency signal generated from control generator 250. Amplifier 254 amplifies the control signal 252 and generates an amplified control signal 256. Amplified control signal 256 is used to drive wavelength tuner 236 to generate pump light 210.

Figure 3:
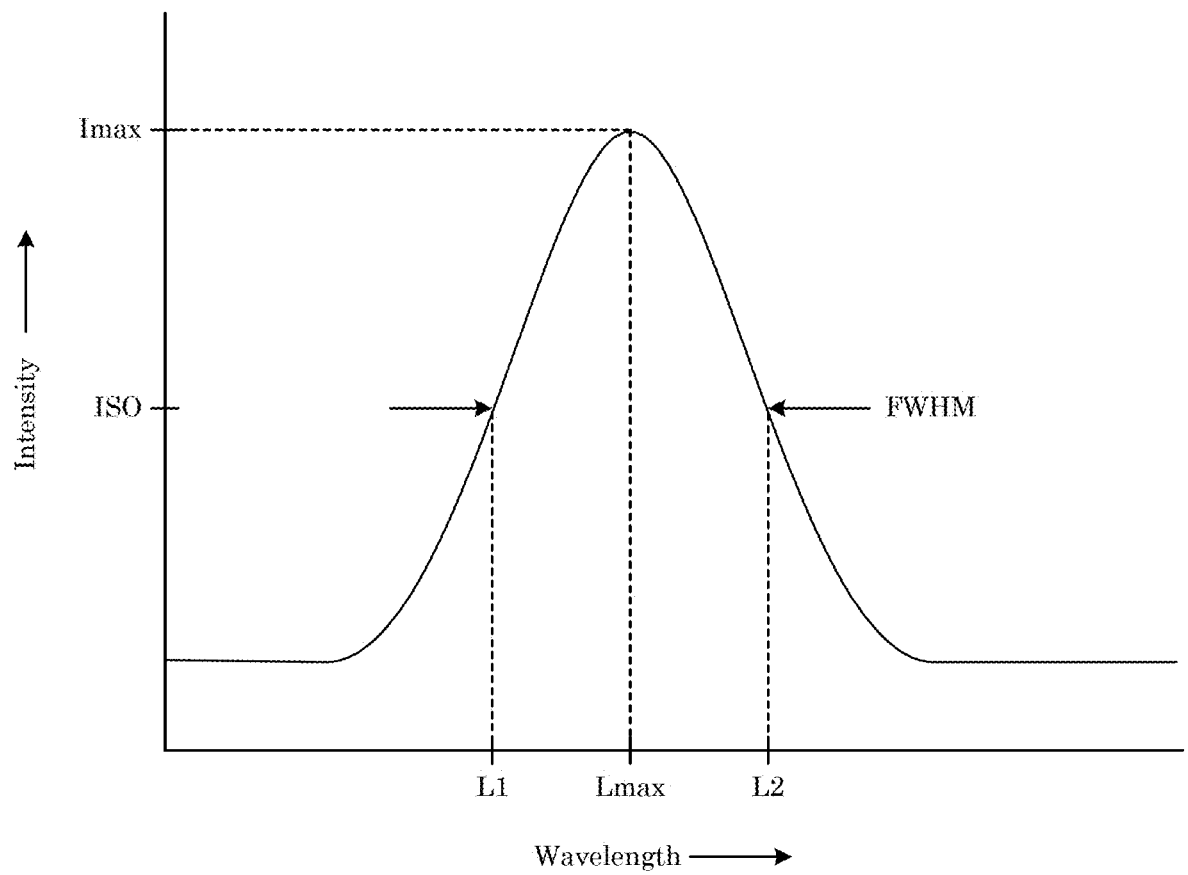
FIG. 3 shows a graph of intensity versus wavelength.
Figure 4:
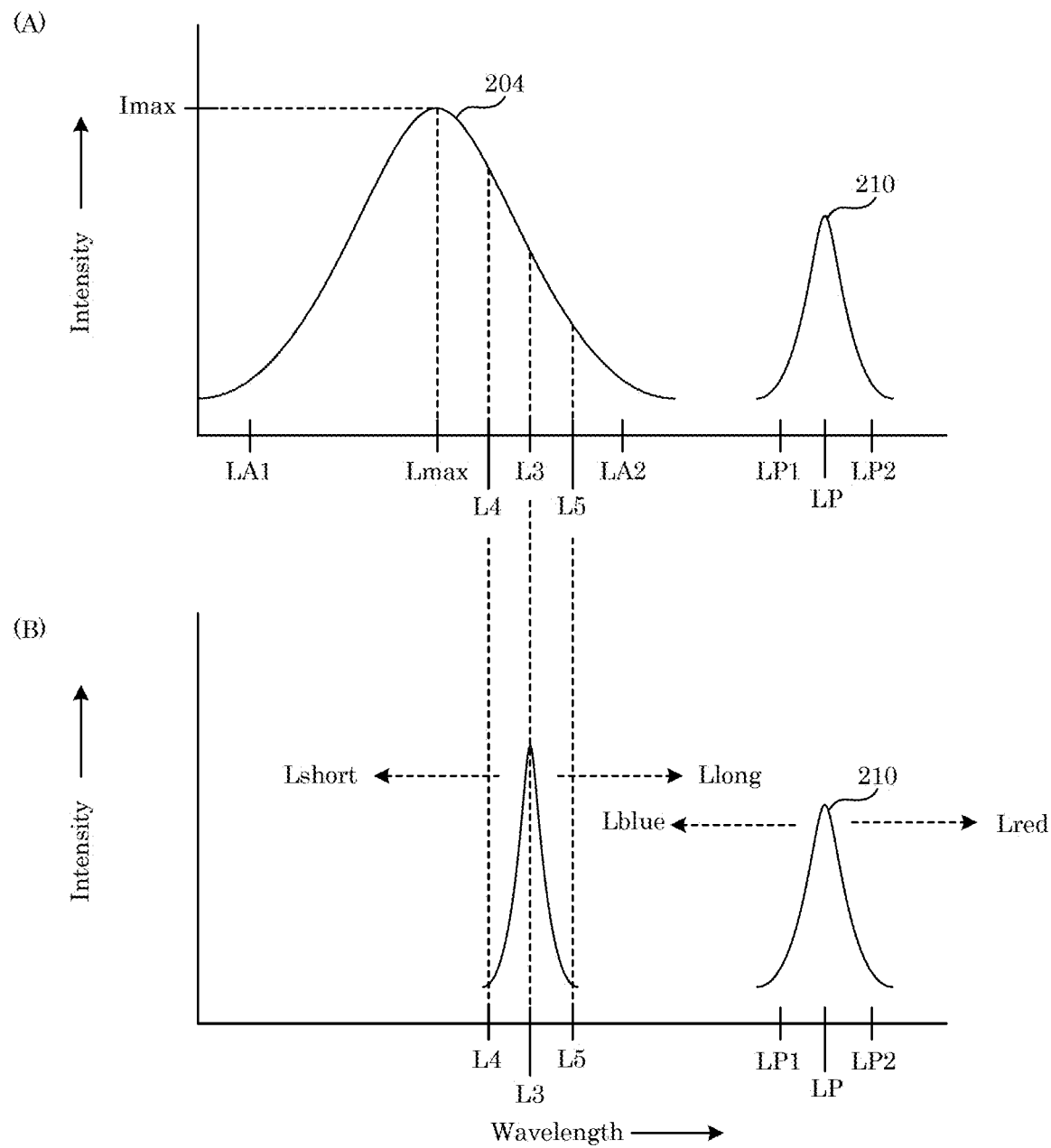
FIG. 4 shows a graph of intensity versus wavelength in panel A and a graph of intensity versus wavelength in panel B.

In an embodiment, with reference to FIG. 3 and FIG. 4, first light source 202 produces single photon light 204 having a spectrum shown in FIG. 3. Here, direct absolute spectrometer 200 directly determines an absolute wavelength Lmax at maximum intensity Imax of single photon light 204. Further, direct absolute spectrometer 200 directly determines an absolute linewidth FWHM of single photon light 204 shown as being from first wavelength L1 to second wavelength L2. The determination of the absolute wavelength Lmax and absolute linewidth FWHM is made directly by direct absolute spectrometer 200. As used herein, "directly" and variants thereof refers to the spectrum being obtained by direct measurement instead of by calculation from measurement results, such as lifetime. As used herein, absolute and variants thereof (e.g., absolutely and the like) refers to a wavelength reading in direct absolute spectrometer 200 that is directly measured in the disclosed processes and that does not need calibration. Direct and absolute determination of wavelength Lmax and linewidth FWHM is a technical improvement over conventional spectrometry that indirectly determines such parameters. Indirect determination can include bandwidth estimated by lifetime.

In an embodiment, a process for making direct absolute spectrometer 200 includes disposing optical combiner 214 in optical communication with first light source 202 and second light source 208 such that single photon light 204 temporally and spatially overlaps pump light 210 in EIT medium 216 in optical cell 206; disposing EIT medium 216 in optical cell 206; disposing optical cell 206 in optical communication with optical combiner 214; and disposing filter 226 in optical communication with optical cell 206. Making direct absolute spectrometer 200 also can include disposing detector 224 in optical communication with filter 226; disposing magnetic shield 218 on optical cell 206. Making direct absolute spectrometer 200 can include, with respect to second light source 208, wavelength tuner 236 in optical communication with laser 232; disposing reference cell 242 in optical communication with laser 232; disposing feedback unit 246 in optical communication with reference cell 242 and in communication with laser 232 to form wavelength locker 238; and disposing control generator 250 in communication with wavelength tuner 236. The process also can include interposing amplifier 254 between and in communication with wavelength tuner 236 and control generator 250; disposing program unit 260 in communication with control generator 250.

In an embodiment, with reference to panel A of FIG. 4, a process for performing direct absolute spectrometry includes receiving dual light 212 by EIT medium 216. Here, single photon light 204 has a wavelength range from first wavelength LA1 to second wavelength LA2 and maximum intensity Imax at wavelength Lmax. Single photon light 204 is in presence of pump light 210 in EIT medium 216. Pump light 210 has a wavelength range from first wavelength LP1 to second wavelength LP2 and maximum intensity at wavelength LP. The spatial and temporal overlap of single photon light 204 and pump light 210 in EIT medium 216 electromagnetically induces transparency in EIT medium 216 with respect to transmission of a portion of single photon light 204 as EIT light 222 that occurs from wavelength L4 to wavelength L5 with a maximum of intensity of EIT light 222 at wavelength L3. Accordingly, output light 220 is output from EIT medium 216 of optical cell 206. It is further contemplated that, a wavelength of pump light 210 can be adjusted, e.g., blue shifted to a shorter wavelength Lblue. As a result, EIT light 222, will be shifted toward shorter wavelength Lshort. It is further contemplated that, a wavelength of pump light 210 can be adjusted, e.g., red shifted to a longer wavelength Lblue. As a result, EIT light 222, will be shifted toward longer wavelength Llong. In this manner, linewidth FWHM and wavelength Lmax of single photon light 204 can be determined by adjusting the wavelength of pump light 210.

In an embodiment, a process for performing direct absolute spectrometry includes combining single photon light 204 with pump light 210; producing dual light 212 in response to combining single photon light 204 and pump light 210; subjecting EIT medium 216 to dual light 212; producing, in EIT medium 216, interacting light 228 as dual light 212 propagates through EIT medium 216; producing, from EIT medium 216, output light 220 from interacting light 228 when EIT medium 216 is optically transparent to single photon light 204 in presence of pump light 210, output light 220 including: pump light 210; and EIT light 222; and absorbing single photon light 204 when single photon light 204 propagates in EIT medium 216 in absence of pump light 210, such that EIT medium 216 does not produce output light 220; filtering output light 220 to remove pump light 210; and producing, from filtering output light 220, EIT light 222 in absence of pump light 210 to perform direct absolute spectrometry.

The process for performing direct absolute spectrometry further can include producing EIT signal 230 from EIT light 222 after filtering output light 220 to remove pump light 210.

The process for performing direct absolute spectrometry further can include adjusting a wavelength of pump light 210; and changing a wavelength of EIT light 222 in response to adjusting the wavelength of pump light 210.

The process for performing direct absolute spectrometry further can include directly determining a linewidth of single photon light 204 based on adjusting the wavelength of pump light 210.

The process for performing direct absolute spectrometry further can include absolutely determining a peak wavelength of single photon light 204 based on adjusting the wavelength of pump light 210.

In the process, combining single photon light 204 with pump light 210 can include polarizing with polarizing beam splitter, which can combine single photon light 204 with pump light 210 with perpendicular polarization states.

In the process, producing dual light 212 in response to combining single photon light 204 and pump light 210 can include aligning single photon light 204 and pump light 210 to be copropagating.

In the process, subjecting EIT medium 216 to dual light 212 causes EIT and generates a narrow transparent window at EIT medium.

In the process, producing, in EIT medium 216, interacting light 228 as dual light 212 propagates through EIT medium 216 transmitting part of single photon light 204 through to make EIT light 222.

In the process, producing, from EIT medium 216, output light 220 from interacting light 228 when EIT medium 216 is optically transparent to single photon light 204 in presence of pump light 210. The part of light 204 passing through the transparent window and pump light 210 includes output light 220.

In the process, absorbing single photon light 204 when single photon light 204 propagates in EIT medium 216 in absence of pump light 210 occurs when single photon light 204 is in the absorption area of EIT media, and it is absorbed without pump light 210.

In the process, filtering output light 220 to remove pump light 210 can include subjecting output light 220 to filters that block pump light 210 and transmit EIT light 222 through optical cell 206.

In the process, producing, from filtering output light 220, EIT light 222 in absence of pump light 210 absorbing single photon light 204 by EIT media in absence of pump light 210.

In the process, producing EIT signal 230 from detector 224 occurs for EIT light 222 after filtering output light 220 to remove pump light 210. EIT light 222 is detected by detector 224 and the detector 224 produces corresponding electrical EIT signal 230.

In the process, adjusting a wavelength of pump light 210 is implemented by a wavelength tuner, which can include an acousto-optic modulator.

In the process, changing a wavelength of EIT light 222 in response to adjusting the wavelength of pump light 210 is implemented by EIT. Wavelengths of EIT light 222 and pump light 210 satisfy the two photon resonance selection rules.

In the process, directly determining a linewidth of single photon light 204 based on linearly adjusting the wavelength of pump light 210. A center wavelength of transparent window of EIT changes linearly with the wavelength of pump light 210, and the spectrum of single photon light 204 can be obtained directly by scanning the wavelength of pump light 210.

In the process, absolutely determining a peak wavelength of single photon light 204 is based on adjusting the wavelength of pump light 210. The pump light is locked to an atomic transition so the measured spectrum of single photon light 204 is the absolute value and does include calibration.

Direct absolute spectrometer 200 and the process for performing direct absolute spectrometry has numerous beneficial uses that includes characterizing narrow bandwidth single photon source and spectral measurements for high spectral resolution.

Moreover, direct absolute spectrometer 200 and for performing direct absolute spectrometry have numerous advantageous properties. In an aspect, direct absolute spectrometer 200 provides spectrum measurement with high spectral resolution, accuracy and sensitivity. Direct absolute spectrometer 200 and performing direct absolute spectrometry unexpectedly include EIT that by which measurement of a spectrum of single photon source is made and provides ultra-high resolution measurement of the spectrum.

The articles and processes herein are illustrated further by the following Example, which is non-limiting.

EXAMPLE

Spectral characterization of single photon sources with ultra-high resolution, accuracy and sensitivity.

In future quantum communication systems, single photons, as the information carriers, possess very narrow linewidths and accurate wavelengths for an efficient interaction with quantum memories. Spectral characterization of such single photon sources is performed with very high spectral resolution, wavelength accuracy, and detection sensitivity. In this Example, we show precise characterization of spectral properties of narrow-linewidth single-photon sources using an atomic vapor cell using electromagnetically-induced transparency (EIT). By using an atomic cesium vapor cell, we have demonstrated a spectral resolution of better than 150 kHz, an absolute wavelength accuracy of within 50 kHz, and detection sensitivity for optical signals as weak as −117 dBm.

Quantum memory implements quantum repeaters and quantum computer networks and are based on ions or atomic ensembles. To integrate with these quantum memories, photonic qubits must have compatible wavelengths and linewidths. Except for a few approaches that work in the off-resonant range to achieve broad bandwidths, such as Raman, most quantum memory approaches work near atomic resonant transition lines and have a bandwidth in the order of MHz. While most entangled photon sources are based on naturally broad (THz) spontaneous processes, such as spontaneous parametric down-conversion (SPDC) or spontaneous four wave mixing (SFWM), suitable linewidths for quantum memory integration have been implemented using extremely narrow filters or cavity enhancement.

To characterize a ~MHz bandwidth source, the spectral resolution of the measuring instrument should have at least one order of magnitude better, i.e. ~100 kHz. This may beyond the ability of many gratings and etalons except for some type of very high-Q (greater than $10^9$) cavity. It is still technically challenging to implement a high spectral stability cavity with such a high Q value. Therefore, the spectral measurement of single photons with linewidths of the order of MHz is difficult for instruments based on traditional optical dispersive elements. Without a suitable spectrometer, conventional single photon linewidths can be estimated indirectly from cavity lifetime measurements. The precise wavelength is uncertain and further tuning is involved for integration with a quantum memory system. In addition, the spectral characterization of such sources requires single-photon level sensitivity.

This Example shows measurement of spectra of narrow-linewidth single photons. The method herein is based on EIT in an atomic vapor cell. It provides high spectral resolution, high wavelength accuracy, and high detection sensitivity for photons at a wavelength close to an atomic transition line. The spectral measurement range can be extended beyond immediate atomic transition lines by including single-photon frequency conversion and correlated biphoton spectroscopy. Cs atoms were studied and their performance in terms of resolution, accuracy, and sensitivity have been determined.

EIT is a destructive interference of two light fields in a three-level atomic energy structure. The optical response of an atomic medium is modified when laser beams lead to quantum interference between the excitation pathways. This quantum interference can eliminate absorption and refraction (linear susceptibility) at the resonant frequency of the atomic transition.

Figure 5:
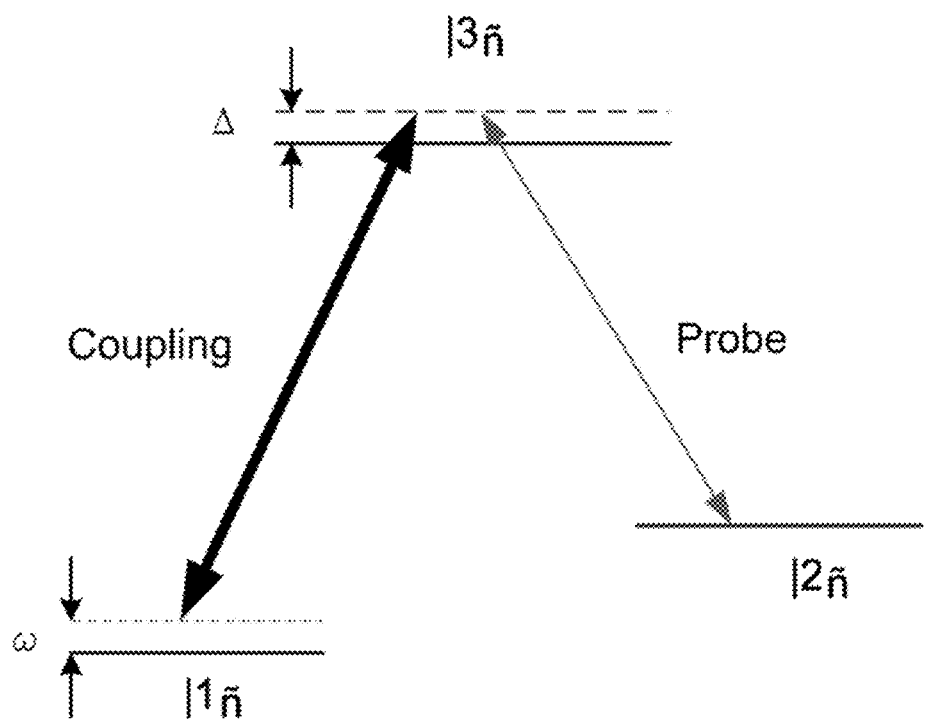
FIG. 5 shows a lambda electromagnetically induced transparency (EIT) energy level configuration.

In the lambda EIT configuration show in FIG. 5, the transition between two lower energy states, |1⟩ and |2⟩, is dipole-forbidden and atoms can remain in either of the two states for a long time. Both energy states have allowed transitions to an excited state, |3⟩. The optical fields that are resonant with the two allowed transitions of the atoms are absorbed by the atoms if they enter the atomic medium alone. However, when the two fields are applied to the atomic medium simultaneously, they interfere destructively, and therefore no atoms are excited to the state |3⟩. Consequently, the field will not be absorbed.

A strong field between |1⟩ and |3⟩ is called the coupling field and a weak field between |1⟩ and |2⟩ is called the probe field. When the control beam is strong and its intensity is constant in time, the response of the atomic ensemble can be described in terms of the linear susceptibility spectrum $\chi^{(1)}(\omega)$, per Eq. (1):

$$\chi^{(1)}(\omega) = g^2 N \frac{\gamma_{12} + i\omega}{(\gamma_{13} + i\omega)(\gamma_{12} + i\omega) + |\Omega|^2}, \quad (1)$$

where $\gamma_{12}$ and $\gamma_{13}$ are the decoherence rates of |1⟩→|2⟩ and |1⟩→|3⟩ transitions respectively, $\Omega$ is the Rabi frequency for the coupling field, N is the total number of atoms in the interaction area, g is the atom-field coupling constant, and $\omega$ is the frequency detuning of the resonance of the two optical fields (the coupling and probe fields). When $\omega=0$, the two optical fields are resonant.

Figure 6:
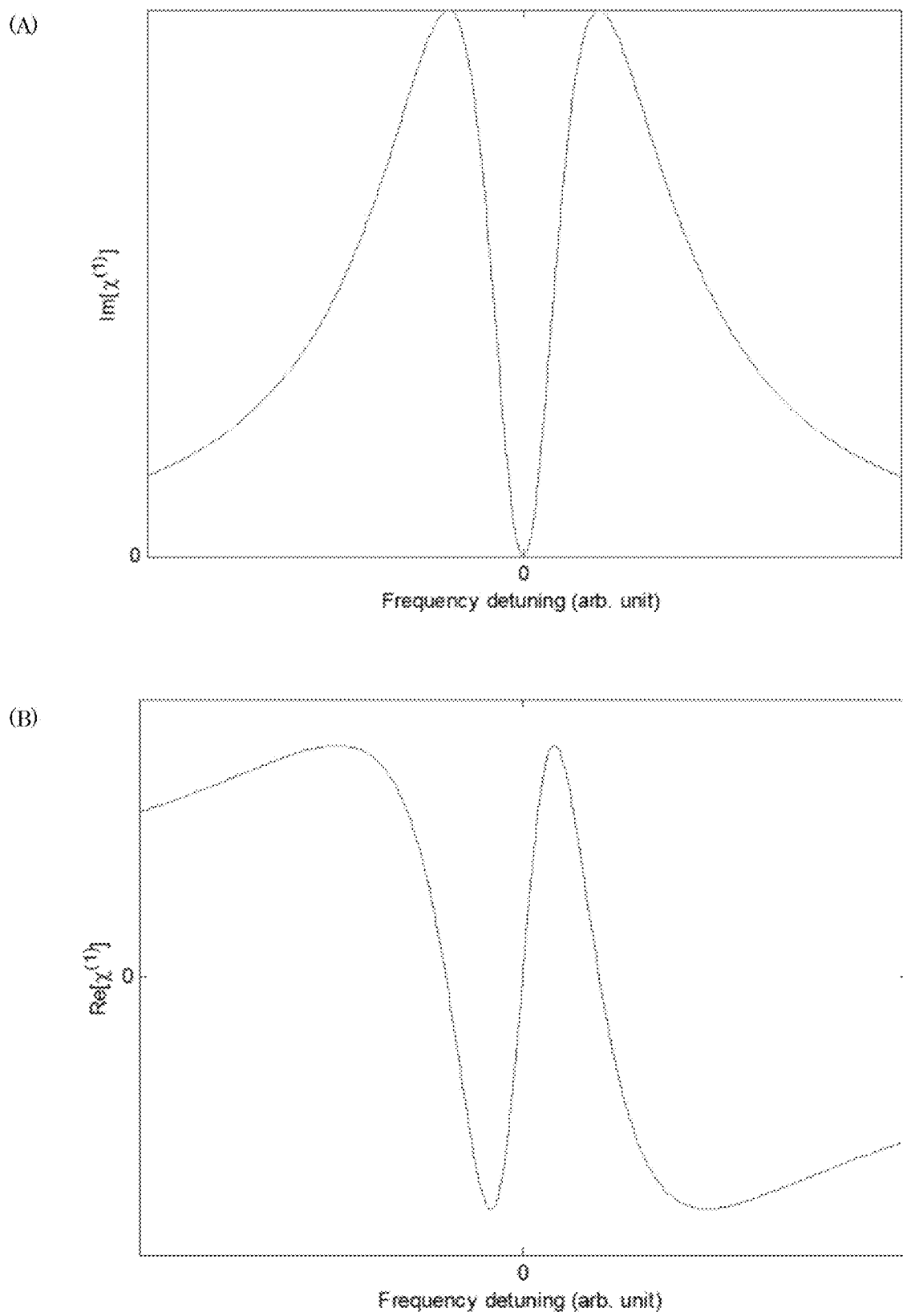
FIG. 6 shows a graph of an imaginary part of susceptibility $\chi^{(1)}$ that represents absorption of a medium versus frequency detuning in an EIT medium in panel A, and panel B shows a graph of a real part of $\chi^{(1)}$ that represents refractive index of the medium versus frequency detuning in an EIT medium.

In an ideal EIT medium, due to the dipole-forbidden transition between |1⟩ and |2⟩, the coherence relaxation rate is very small, i.e. $\gamma_{12} \to 0$. Based on Eq. (1), the linear susceptibility spectrum of the EIT medium for a signal beam is shown in FIG. 6. The linear response of an atom to the light can be described by the linear susceptibility $\chi^{(1)}$. The imaginary part of $\chi^{(1)}$ determines the dissipation of the field by the atomic gas (i.e. absorption), while the real part of $\chi^{(1)}$ determines the refractive index. From panel A of FIG. 6, when $\Psi=0$, the imaginary part of $\chi^{(1)}$ goes to zero, which indicates no absorption at the atomic resonance. In other words, the medium is transparent. The transparent frequency is determined by the frequency detuning of two optical fields and the transparency window is usually very narrow. Therefore, the spectrum of the probe light can be obtained by scanning the frequency of the coupling light.

Figure 7:
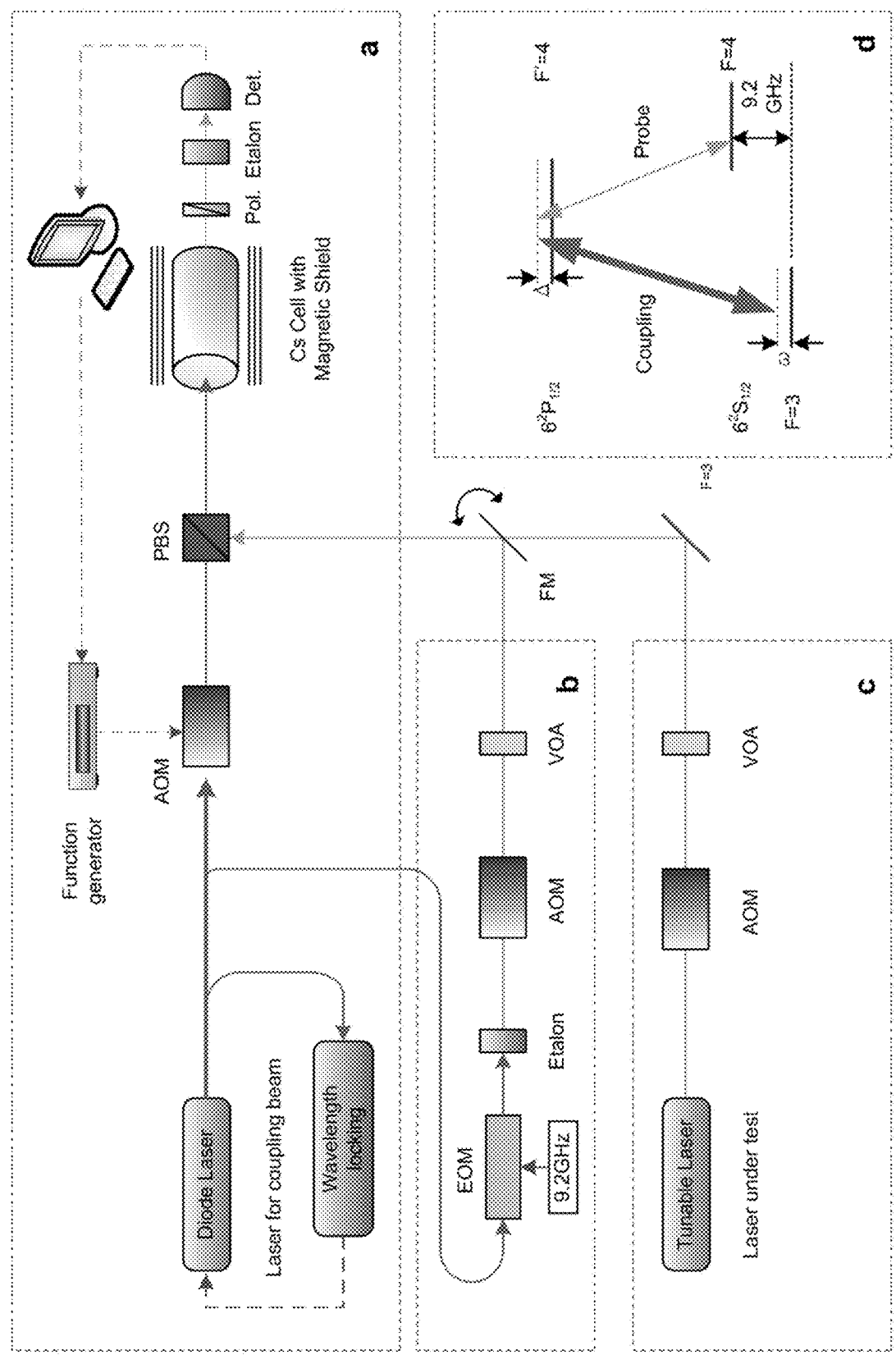
FIG. 7 shows a direct absolute spectrometer for (box a) a set-up, with (box b) calibration probe light generation, and (box c) photon source under test for (box d) an energy structure of Cs atom, wherein acronyms and abbreviations are as follows EOM: electro-optic modulator; AOM: acousto-optic modulator; PBS: polarizing beam splitter; FM: flip mirror; VOA: variable optical attenuator; Pol.: Glan-Thompson polarizer; Det.: single photon detector.

To accurately measure the spectrum and linewidth of single photons, we developed an experimental spectrometer based on EIT in a warm Cs atomic cell. The configuration of the spectrometer is shown in FIG. 7 (Box a). A tunable CW diode laser around 895 nm is locked to the Cs D1 transition $6^2S_{1/2}$ F=3→$6^2P_{1/2}$ F'=4. The beam was modulated by an acousto-optic modulator (AOM). The frequency of the first order diffraction output of the AOM is determined by Eq. (2):

$$\nu_{out} = \nu_{in} + \nu_{ac}, \quad (2)$$

where the $\nu_{in}$ and $\nu_{out}$ are the frequency of input and output optical field of an AOM and $\nu_{ac}$ is the AOM driving frequency from an RF function generator that can be scanned and controlled by a computer.

The coupling beam is combined with the probe beam (the light under test) using a polarizing beam splitter (PBS) and is then sent into the Cs cell. The Cs cell is shielded in a 3-layer μ-metal chamber to block external stray magnetic fields. The vapor cell is heated by a temperature controller. After the beam passes through the cell, the coupling light is removed by a Glan-Thompson polarizer and a Fabry Perot (FP) Etalon. The probe light is transmitted and detected by a single-photon detector. The output photon-count signal from the Si-APD is sent to the same computer. While the computer scans the RF signal (i.e., AOM driving frequency), it simultaneously collects the counts from the single photon detector. A spectrum based on the scanning frequency and corresponding photon counts is recorded and analyzed by a specifically built computer program.

To calibrate the spectrometer, we generated a probe field from the coupling light directly (Box b in FIG. 7). An electro-optic phase modulator (EOM) is used to generate sidebands at about a 9.2 GHz separation corresponding to the hyperfine splitting of the two ground states of Cs. An etalon selects the red-shifted sideband light, which corresponds to the transition $6^2S_{1/2}$ F=4→$6^2P_{1/2}$ F'=4. Another AOM is used to provide a similar detuning from the atomic transition and a variable optical attenuator is used to attenuate the light to single-photon level for system calibration. To experimentally study the performance of the spectrometer, we use another tunable laser as an independent photon source (Box c in FIG. 7). Box d in FIG. 7 shows the energy structure for the experiment.

High spectral resolution is provided by this spectrometer. The spectral resolution is determined by the linewidth of the coupling field and the bandwidth of EIT transparent window. The linewidth of coupling field is determined by the laser linewidth, which is about 100 kHz in our experiment. The bandwidth of EIT transparent window for a Cs gas cell is influenced by the magnetic shield, cell temperature, coupling light power and angle between probe and coupling light. To ensure a narrow bandwidth, the cell is magnetically shielded by a 3-layer μ-metal chamber and the probe and coupling light are aligned in the same direction. The relationship between the bandwidth of EIT transparent window and coupling beam power and the cell temperature has been extensively studied. The full width half maximum (FWHM) of EIT bandwidth can be estimated by Eq. (3):

$$EIT_{FWHM} = 2\frac{|\Omega|^2}{\gamma_{13}}\frac{1}{\sqrt{\alpha L}}, \qquad (3)$$

where $EIT_{FWHM}$ is the FWHM of the EIT transparent window bandwidth and αL is the optical depth. The $|\Omega|^2$ is linearly proportional to the intensity of the coupling field, so the bandwidth is linearly proportional to the intensity of the coupling beam. The optical depth (αL) increases with the cell temperature, so the higher the temperature, the narrower the bandwidth.

Although a narrower bandwidth can be obtained with lower intensity of coupling beam or higher cell temperature, there is a tradeoff between bandwidth and transmittance of EIT transparent window. The transmittance directly influences the spectrometer's sensitivity. The output probe field intensity can be estimated by Eq. (4):

$$|E|_{out}^2 = |E|_{in}^2 \exp\left(-\alpha L \frac{\gamma_{13}\gamma_{12}}{2|\Omega|^2}\right), \qquad (4)$$

where $|E|_{out}^2$ and $|E|_{in}^2$ are the output and input intensity of probe beam. When $\gamma_{12}$ is not zero, the probe field will be attenuated through the EIT transparent window, and the attenuation is proportional to optical depth (αL) and inversely proportional to $|\Omega|^2$. Therefore, a narrower bandwidth of the EIT transparent window will increase the loss for the probe field and reduce the spectrometer sensitivity.

Figure 8:
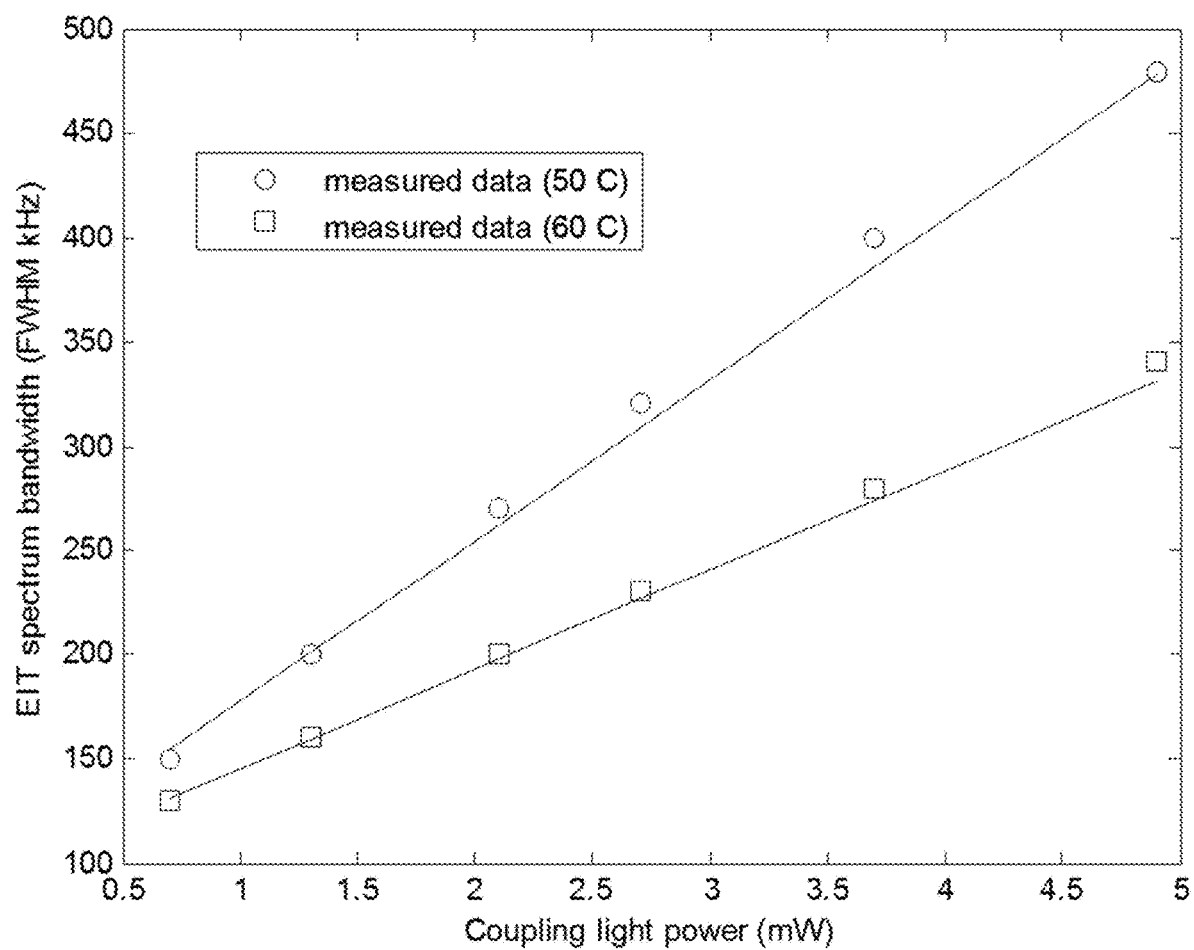
FIG. 8 shows a graph of bandwidth versus light power for a bandwidth of EIT transparent window with calibartion probe light.

A special calibration probe beam is generated (box b in FIG. 7) and then used to calibrate the EIT spectrometer. The calibration probe beam is a small portion split from the coupling beam and then shifted 9.2 GHz (the hyperfine splitting in the ground level), so any wavelength instability will not influence the measurement in the calibration procedure. FIG. 8 shows the measured bandwidth of the EIT signal of the calibration probe beam as a function of coupling beam power and cell temperature. The bandwidth of the transparent window decreases with lower coupling beam intensity and higher temperature. When the coupling beam power is reduced to 0.7 mW, the bandwidth reaches approximately 120 kHz, which is already close to the linewidth of the laser beam itself. However, the transmittance is already low at such a power level. As a compromise between bandwidth and transmittance, we set the cell temperate to be 60 C and coupling beam power to be 1.3 mW. In this setting, we can get a resolution of approximately 150 kHz with a 40% transmittance at the center of the EIT window. The resolution and the transmittance can be optimized by varying the cell temperature or coupling beam power to accommodate a variety of measurements.

The spectrometer measures signals at a single-photon power level, and its sensitivity is a performance parameter. The sensitivity is determined in part by transmittance, detection efficiency, and noise.

Transmittance is determined by the transmittance of both the EIT transparent window and the filtering system. The transmittance of the EIT transparent window is determined by the coupling beam power and cell temperature. However, the higher the transmittance, the lower the spectral resolution. In our experiment, we balance the two parameters with a 150 kHz resolution and a 40% transmittance. The filtering system is designed to significantly suppress the coupling beam, but it also causes losses in the probe beam. The measured transmittance of the filtering system for the probe beam is approximately 80%. The detection efficiency of the single photon detector is approximately 38% near 895 nm. Therefore, the overall efficiency is approximately 12%.

The noise of the spectrometer is due to intrinsic dark counts of the single photon detector, fluorescence photons generated in the cell, and residual photons from coupling beam. The intrinsic dark count rate is a constant, approximately 100 counts per second in our case. The fluorescence in the cell is mainly caused by collisions between atoms and collisions between the atoms and the cell wall. A buffer-gas-free and paraffin-coated cell can reduce the collision-induced fluorescence, and this kind of cell is used in this experiment.

In the spectrometer, a strong coupling beam comes out of the cell together with the weak probe beam at a single-photon power level. The residual coupling beam becomes a significant source of noise in the system. Since the two beams should propagate collinearly through the cell to achieve an optimal resolution, a spatial filter is not suitable. Therefore, only polarization and spectral filters can be used to suppress the coupling beam. A Glan-Thompson polarizer is used as the polarization filter providing more than a 60-dB extinction in our experiment. For spectral filtering, since the frequency separation between the probe and the coupling beams is small (only 9.2 GHz in our experiment), it is not feasible to use dispersion-based spectral filters. Custom designed FP etalons are used as spectral filters in this experiment. The FP etalon is designed with a free spectral range of 18.4 GHz (9.2 GHz×2) and a finesse of 17, which optimizes the extinction ratio of the transmittance for the probe to the coupling beams. Two FP etalons in series can provide more than 40 dB suppression to the coupling beam and approximately 80% transmittance for the probe beam. Combining the polarization filter and spectral filters, the coupling beams is suppressed by over 100 dB.

Figure 9:
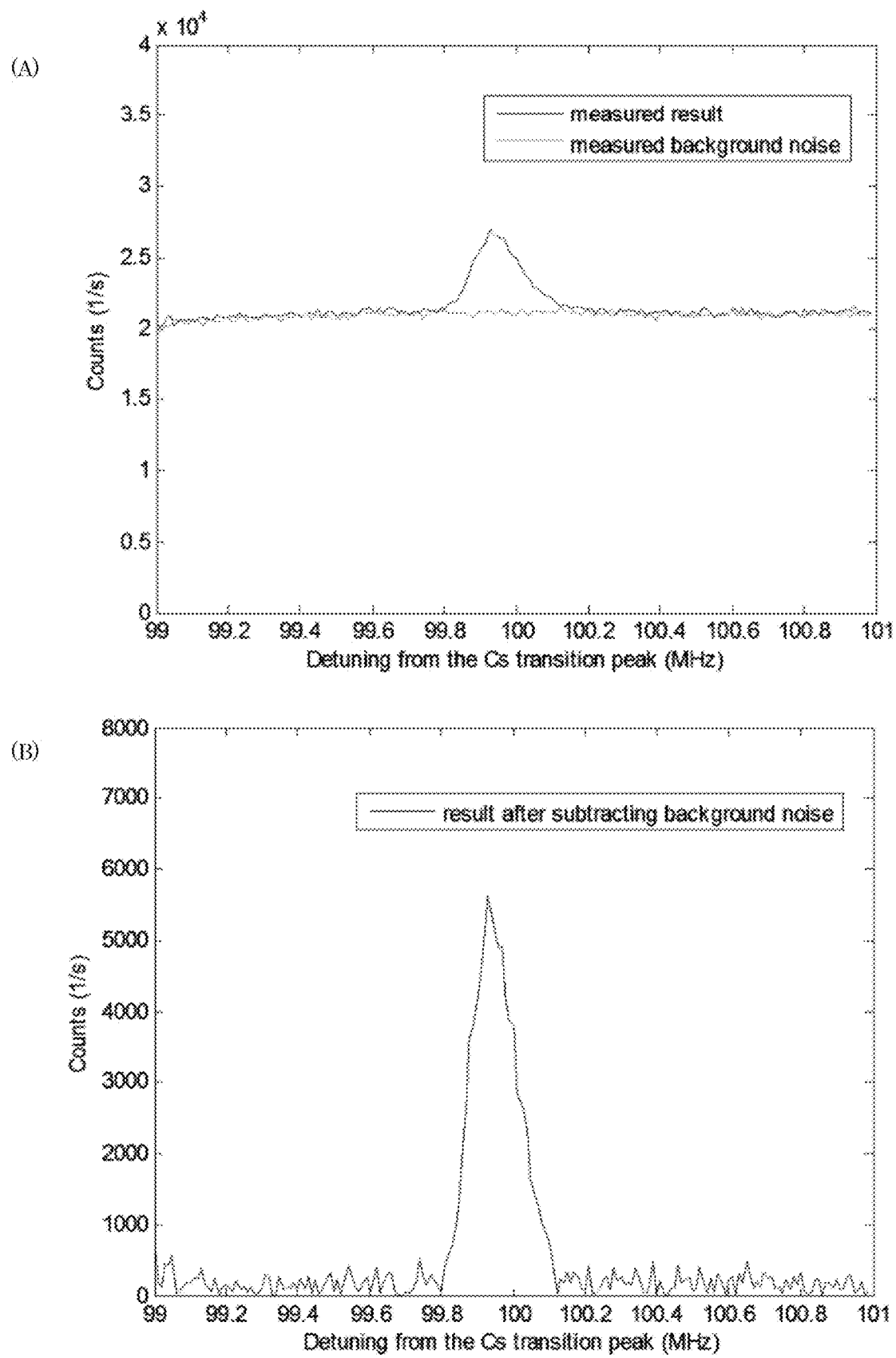
FIG. 9 shows, in panel A, a graph of counts versus detuning for a measured result and measured background noise, and panel B shows a graph of counts versus detuning for a measured result after subtracting background noise.

These noise sources are spectrally independent and nearly constant within the measurement range. Therefore, noise can be measured separately, and easily subtracted from the measurement results. Panel A of FIG. 9 shows a measured result and a corresponding measured background noise under the same conditions. Panel B of FIG. 9 shows a clean result after the background noise is subtracted. In this case, the measurement sensitivity is limited only by the noise deviation.

Figure 10:
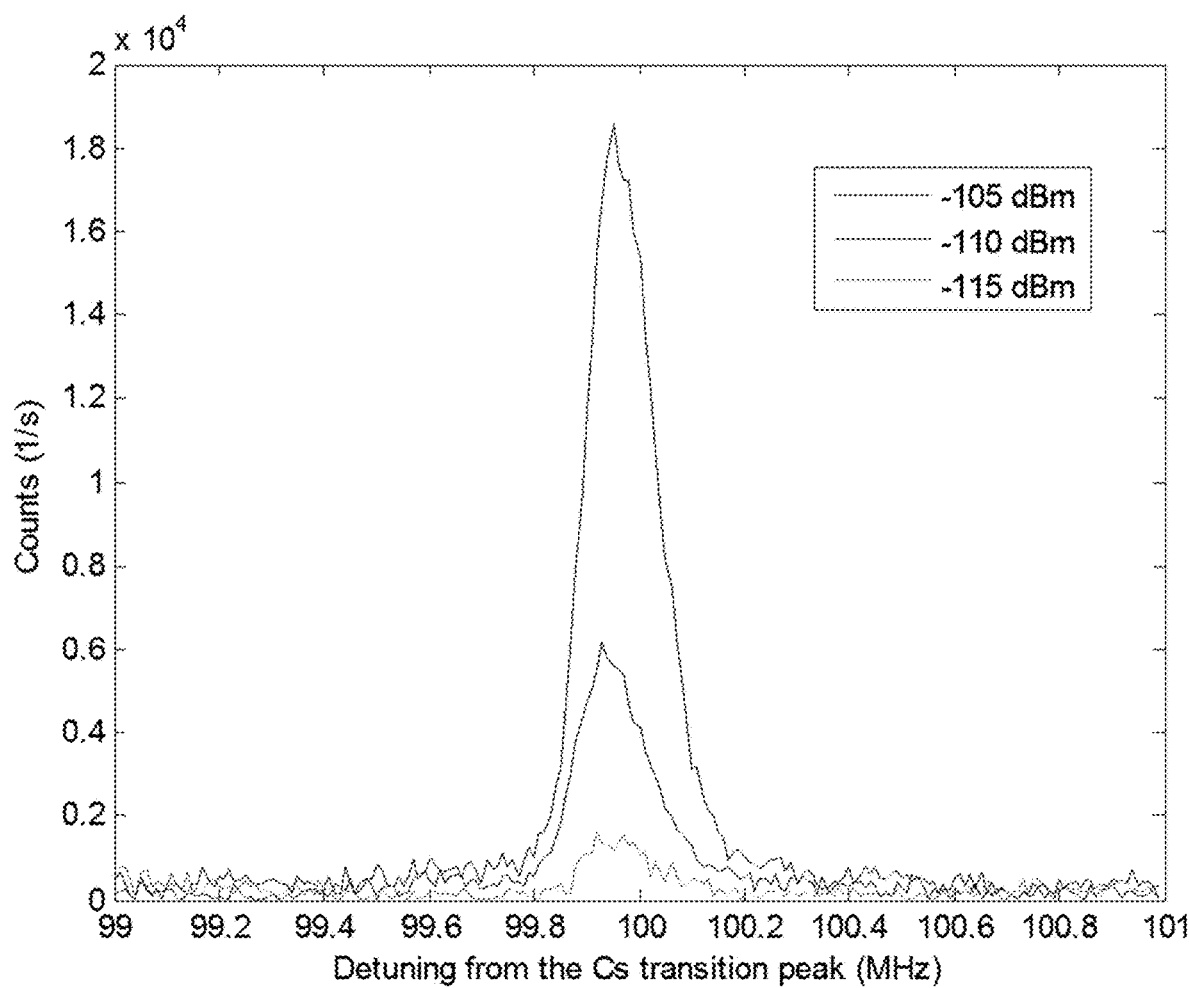
FIG. 10 shows a graph of counts versus detuning for optical signals at −105 dBm, −110 dBm, and −115 dBm after background noise subtraction.

The spectrometer sensitivity is determined by detection efficiency and deviation of noise. The noise counts have a shot noise behavior whose deviation is equal to the square root of the average number of counts. The noise count rate in the measurement range is approximately 20000 counts per second, so the noise count deviation is approximately 140 counts per second. Because we need to perform measurements two times (one for signal and another for background), the total noise deviation after subtracting the background noise is approximately 280 counts per second. To get a clear spectrum, the signal counts should be 5 times greater than the deviation. When we take the total efficiency of 12% into account, the spectrometer can measure signals as week as approximately 11000 photons per second (or −117 dBm at 895 nm). We attenuated the optical signal from the tunable laser under test to −105 dBm, −110 dBm and −115 dBm, and their spectrum measurement results are shown in FIG. 10. The results show the spectrum peak of the −115 dBm optical signal is clearly above the noise deviation level. It is worth pointing out that current superconducting single photon detectors, such as supercomputing nanowire single-photon detectors or superconducting transition-edge sensor detectors, can achieve close to 100% detection efficiency and a lower dark count rate compared to the Si-APD. If such type of single photon detector replaced the Si-APD in this set-up, the spectrometer sensitivity may be further enhanced by about a factor of three.

Figure 11:
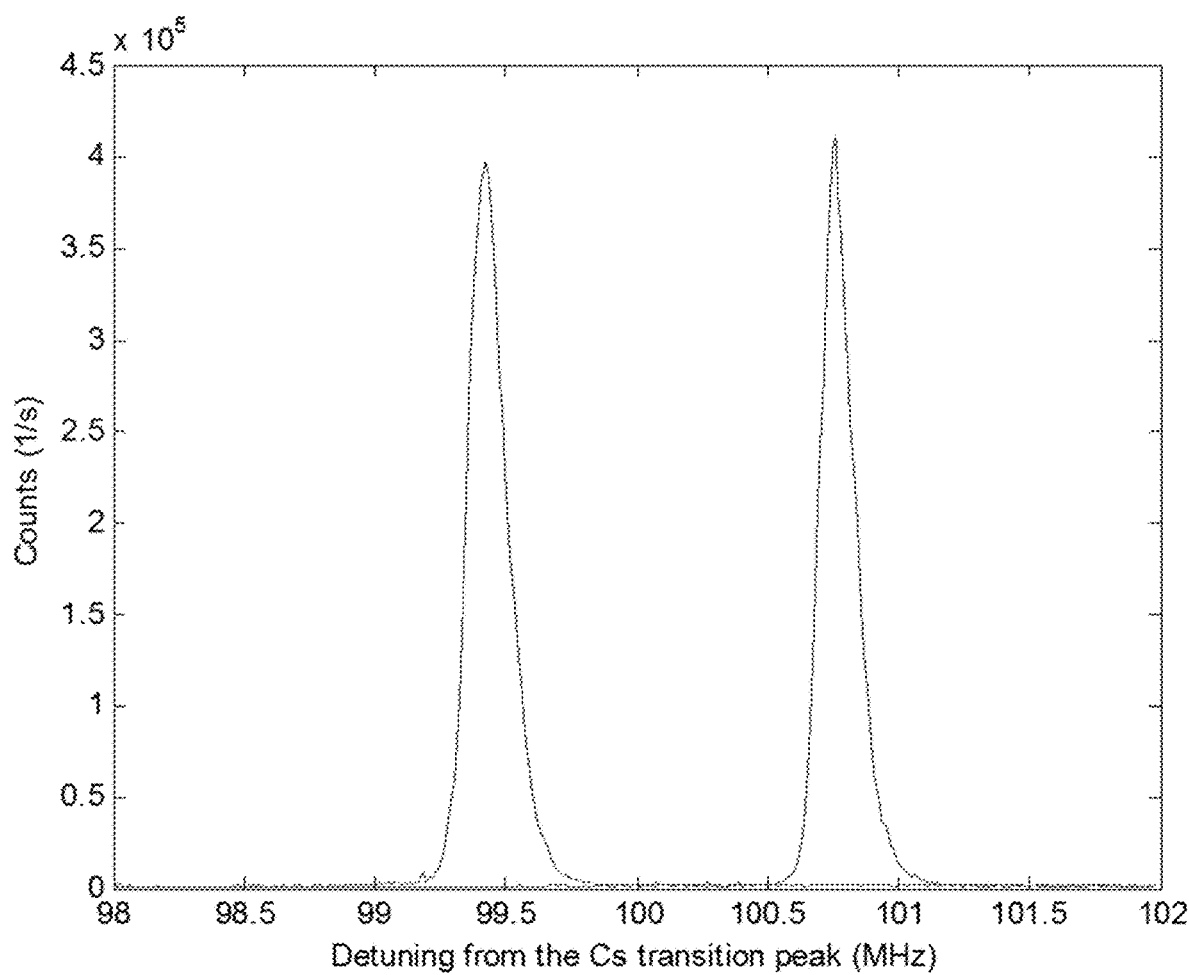
FIG. 11 shows a graph of counts verus detuning for two optical signals at different wavelengths after background noise subtraction.

Wavelength accuracy of the spectrometer is determined by the wavelength accuracy of the coupling beam. The coupling beam is from a diode laser and shifted by an AOM. The frequency shift of the AOM is controlled by a function generator, which has Hz level accuracy. Therefore, the accuracy is primarily determined by the wavelength accuracy of the coupling beam laser. The laser wavelength is locked to the peak of Doppler free hyperfine line of $6^2S_{1/2}$ F=4→$6^2P_{1/2}$ F'=4 transition based on Cs atom absorption saturation spectroscopy. The bandwidth of the natural line width of Cs D1 line (Doppler free hyperfine line) is approximately 5 MHz. With suitable parameters in Pound-Drever-Hall and proportional-integral-differential control settings, the wavelength can be accurately locked to within 1% of the bandwidth of the natural linewidth. Therefore, the wavelength reading of the spectrometer can be calibrated by the Doppler free hyperfine line of Cs atoms with an accuracy of better than 50 kHz. To demonstrate wavelength accuracy of our measurement, two optical signals with 1.4 MHz frequency difference separated by an AOM are generated and then measured by the spectrometer. FIG. 11 shows the measured frequency separation for the two signals is very close to 1.4 MHz.

Direct measurement range of the EIT spectrometer involves the absorption area around the atomic transitions, where EIT can be observed. The Doppler broadened absorption range is temperature dependent, and is a few hundred MHz for Cs atom. The spectrum of single-photon sources in this range can be characterized directly using this approach. Single photon sources whose wavelength is not close to a suitable atomic transition line can be frequency-converted to this wavelength range and then measured using this approach. Since single photon frequency conversion was first proposed in 1990, single photon frequency conversion has involved nonlinear optical processes, such as sum-frequency generation in bulk and waveguided periodically-poled lithium niobate and four-wave mixing in fiber. Single photon conversion can occur in telecom wavelength (around 1550 nm or 1310 nm) to atomic transition wavelengths. It has been demonstrated that the quantum states of these photons are preserved during the conversion process. The wavelength of the converted photons is dependent on the wavelengths of both the original photon and the pump light. Therefore, using a narrow-linewidth and wavelength-stable pump laser, the spectral information of the original photon source can be obtained by measuring the converted photon. Such a frequency conversion based spectrometer has been demonstrated to measure the spectrum in the infrared range. The same technology can also extend the measurement range of this EIT-based spectrometer to other wavelengths, such as the telecom region.

Moreover, correlated biphoton spectroscopy is another method for extending the measurement wavelength range. Correlated biphoton spectroscopy is a technique used to measure the spectral characteristics of an object, such as an optical filter or an absorber, by monitoring the coincidence counts from correlated signal and idler photon pairs generated by SPDC. Like frequency-conversion technology, if the pump wavelength in correlated biphoton spectroscopy is stable and has a narrow linewidth, an accurate spectral measurement of single photons in one beam can be obtained by measuring its correlated twin photons in another beam. We have generated signal photons at a telecom (near 1310 nm) wavelength and idler photons at an atomic (cesium near 895 nm) transition wavelength. By applying the EIT spectrometer for the spectral measurement of 895 nm photons, the 1310 nm telecom spectrum can be obtained by coincidence counting. With regard to direct measurement range of the EIT spectrometer, single photon frequency conversion and correlated biphoton spectroscopy technologies extend the technology to any other wavelength ranges while maintaining the performance, including high spectral resolution, high wavelength accuracy, and high detection sensitivity.

For a single photon source to efficiently interact with quantum memories, the spectrometer characterizes the single photon source's spectral properties including wavelength and linewidth. Based on the principle of electromagnetically-induced transparency (EIT), the spectrometer precisely characterizes the spectral properties of narrow-linewidth single-photon sources using an atomic vapor cell. The method can be used for spectrum measurement of narrow linewidth weak optical signals, such as for the characterization of the narrow linewidth single photon sources for quantum memories. By using a Cs atomic vapor cell and Si-APD, we experimentally demonstrated this method with a spectral resolution of better than 150 kHz, a wavelength reading that is accurate to within 50 kHz and a sensitivity suitable for optical signals as weak as −117 dBm. By using superconducting single photon detectors, the sensitivity can be increased further. This method is demonstrated with Cs atoms, but it can also be applied to other atomic systems commonly used as storage media for quantum memories, such as Rubidium. In addition, by integrating single-photon frequency conversion or correlated biphoton spectroscopy, this technology can also be used for the characterization of single-photon sources at wavelengths that are not close to resonant transitions in atoms.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A direct absolute spectrometer to perform direct absolute spectrometry, the direct absolute spectrometer comprising:
    a first light source that provides single photon light;
    a second light source that provides pump light;
    an optical combiner in optical communication with the first light source and in optical communication with the second light source and that:
        receives the single photon light from the first light source;
        receives the pump light from the second light source;
        combines the single photon light and the pump light; and
        produces dual light that comprises the single photon light and the pump light;
    an optical cell that receives the dual light from the optical combiner;
    an electromagnetically induced transparent (EIT) medium disposed in the optical cell, the EIT medium being:
        optically transparent to the single photon light in a presence of the pump light, such that the EIT medium produces output light comprising:
            the pump light; and
            an EIT light; and
        optically opaque to the single photon light in an absence of the pump light,
    such that the EIT medium does not produce the output light; and
    a filter in optical communication with the EIT medium and that:
        receives the output light from the optical cell when output light is produced by the EIT medium;
        filters the pump light from the output light; and
        provides the EIT light free from pump light,
    wherein the EIT light is a direct and absolute metric of a linewidth and a wavelength of the single photon light such that the direct absolute spectrometer provides direct and absolute determination of the linewidth of the single photon light and direct and absolute determination of wavelength at a maximum of intensity of the single photon light.

2. The direct absolute spectrometer of claim 1, further comprising a magnetic shield disposed on the optical cell to shield the EIT medium from a magnetic field external to the optical cell.

3. The direct absolute spectrometer of claim 1, further comprising a detector in optical communication with the filter and that:
    receives the EIT light from the filter; and
    produces EIT signal, based on EIT light.

4. The direct absolute spectrometer of claim 1, wherein the second light source comprises:
    a laser to produce laser light;
    a wavelength tuner in optical communication and that receives laser light from laser and produces pump light.

5. The direct absolute spectrometer of claim 4, wherein the second light source further comprises:
    a wavelength locker in optical communication with the laser and that:
        receives the laser light from laser; and
        produces laser lock that is communicated to laser to lock a wavelength of laser light.

6. The direct absolute spectrometer of claim 5, wherein the wavelength locker comprises:
    a reference cell in optical communication with the laser and that:
        receives the laser light from laser; and
        produces reference signal, based on laser light; and
    a feedback unit in communication with reference cell and that:
        receives the reference signal from the reference cell; and
        produces the laser lock, based on the reference signal.

7. The direct absolute spectrometer of claim 4, wherein the second light source further comprises:
    a tuner controller in electrical communication with the wavelength tuner and that:
        produces a control signal that is communicated to wavelength tuner to control production of pump light by wavelength tuner.

8. The direct absolute spectrometer of claim 1, wherein the filter comprises an etalon, a polarizer, an atomic filter, or a combination comprising at least one of the foregoing optical elements.

9. The direct absolute spectrometer of claim 1, wherein a wavelength of single photon light is less than a wavelength of pump light.

10. The direct absolute spectrometer of claim 1, wherein a wavelength of EIT light is less than a wavelength of pump light.

11. The direct absolute spectrometer of claim 1, wherein the EIT medium comprises an atomic vapor.

12. A process for performing direct absolute spectrometry, the process comprising:
    combining a single photon light with a pump light;
    producing a dual light in response to combining the single photon light and the pump light;
    subjecting an electromagnetically induced transparent (EIT) medium to the dual light;

producing, in the EIT medium, interacting light as the dual light propagates through the EIT medium;

producing, from the EIT medium, output light from the interacting light when the EIT medium is optically transparent to the single photon light in a presence of the pump light, the output light comprising:
the pump light; and
an EIT light; and absorbing the single photon light when the single photon light propagates in the EIT medium in an absence of the pump light, such that the EIT medium does not produce the output light;

filtering the output light to remove the pump light; and
producing, from filtering the output light, EIT light in an absence of the pump light to perform direct absolute spectrometry.

13. The process for performing direct absolute spectrometry of claim 12, further comprising:
producing an EIT signal from the EIT light after filtering the output light to remove the pump light.

14. The process for performing direct absolute spectrometry of claim 12, further comprising:
adjusting a wavelength of the pump light; and
changing a wavelength of the EIT light in response to adjusting the wavelength of the pump light.

15. The process for performing direct absolute spectrometry of claim 14, further comprising:
directly determining a linewidth of the single photon light based on adjusting the wavelength of the pump light.

16. The process for performing direct absolute spectrometry of claim 14, further comprising:
absolutely determining a peak wavelength of the single photon light based on adjusting the wavelength of the pump light.

17. The process for performing direct absolute spectrometry of claim 12, wherein the EIT medium comprises an atomic vapor.

18. The process for performing direct absolute spectrometry of claim 12, wherein the atomic vapor comprises a plurality of cesium atoms.

* * * * *